United States Patent
Kunisawa et al.

(10) Patent No.: US 8,261,797 B2
(45) Date of Patent: Sep. 11, 2012

(54) RUBBER COMPOSITION FOR COATING TEXTILE CORD AND TIRE USING THE SAME

(75) Inventors: Tetsuya Kunisawa, Kobe (JP); Mamoru Uchida, Kobe (JP); Tomoaki Hirayama, Kobe (JP); Takao Wada, Kobe (JP)

(73) Assignee: Sumitomo Rubber Industries, Ltd., Kobe-Shi (JP)

( * ) Notice: Subject to any disclaimer, the term of this patent is extended or adjusted under 35 U.S.C. 154(b) by 0 days.

(21) Appl. No.: 11/643,659

(22) Filed: Dec. 22, 2006

(65) Prior Publication Data

US 2007/0149664 A1 Jun. 28, 2007

(30) Foreign Application Priority Data

Dec. 28, 2005 (JP) .................. 2005-378216

(51) Int. Cl.
- B60C 1/00 (2006.01)
- B60C 9/02 (2006.01)
- C08K 3/34 (2006.01)

(52) U.S. Cl. ........................ 152/564; 524/493
(58) Field of Classification Search .................. 524/493
See application file for complete search history.

(56) References Cited

U.S. PATENT DOCUMENTS

| | | | | |
|---|---|---|---|---|
| 4,482,663 A * | 11/1984 | Kraus | ............................... | 524/99 |
| 5,396,940 A * | 3/1995 | Segatta et al. | .............. | 152/209.1 |
| 5,948,842 A * | 9/1999 | Araki et al. | ................... | 524/261 |
| 6,371,183 B1 * | 4/2002 | Ubukata et al. | ............... | 152/534 |
| 2004/0182486 A1 * | 9/2004 | Bernard et al. | .......... | 152/209.12 |
| 2005/0234165 A1 * | 10/2005 | Schaal et al. | ................... | 524/210 |
| 2005/0234182 A1 * | 10/2005 | Kunisawa | ..................... | 524/496 |

FOREIGN PATENT DOCUMENTS

| | | |
|---|---|---|
| EP | 0647591 A1 | 4/1995 |
| EP | 0983966 A1 | 3/2000 |
| EP | 1323549 A2 | 7/2003 |
| EP | 1685980 A1 | 8/2006 |
| EP | 1686152 A1 | 8/2006 |
| EP | 1803765 A2 | 7/2007 |
| JP | 7-17208 A | 1/1995 |
| JP | 8-230411 A | 9/1996 |
| JP | 2000-7839 A | 1/2000 |
| JP | 2000-234036 A | 8/2000 |
| JP | 2003-63206 A | 3/2003 |
| JP | 2003-64222 A | 3/2003 |
| JP | 2006-143821 A | 6/2006 |

OTHER PUBLICATIONS

PPG Industries, Inc, Hi-Sil 200 Series, 2008.*
Office Action issued on Mar. 5, 2012, in corresponding European Patent Application No. 06026357.1.

* cited by examiner

*Primary Examiner* — Liam Heincer
(74) *Attorney, Agent, or Firm* — Birch, Stewart, Kolasch & Birch, LLP

(57) ABSTRACT

The present invention provides a rubber composition for coating a textile cord, and a tire using the rubber composition, wherein rolling resistance is lowered, and processability and rubber strength are excellent, as compared with a rubber composition for coating a textile cord comprising raw materials derived from petroleum resources as a main component, and a tire using the rubber composition, while considering environments and providing for the future decrease in petroleum resources supply. The rubber composition for coating a textile cord comprises 25 to 80 parts by mass of silica and 1 to 15 parts by mass of a silane coupling agent on the basis of 100 parts by mass of a diene rubber, wherein a nitrogen adsorbing-specific surface area of said silica is 70 to 150 $m^2/g$.

3 Claims, No Drawings

RUBBER COMPOSITION FOR COATING TEXTILE CORD AND TIRE USING THE SAME

This application claims priority under 35 U.S.C. §119(b) to Japanese Application No. 2005-378216 filed on Dec. 28, 2005.

BACKGROUND OF THE INVENTION

The present invention relates to a rubber composition for coating a textile cord and a tire using the rubber composition.

Generally, a heavy load is applied to automobile tires, and thus, as a reinforcing material, a steel cord has been used for a breaker, and a textile cord has been used for a carcass. Since a tire generates heat particularly during running, if the rubber and a cord are peeled apart, crucial damage is caused to the tire. When a steel cord is used as a cord of a carcass, there is a problem that steering stability, ride quality, rolling resistance etc. are deteriorated.

Conventionally, raw materials derived from petroleum resources such as carbon black have been mainly used in the rubber composition for coating a textile cord. However, in recent years, interests in environmental preservation on the earth have grown and automobiles not being excepted, regulations for suppressing $CO_2$ emissions are being enforced. Further, since petroleum resources are limited and the supply thereof has been decreasing year by year, oil prices are expected to increase in the future, and consequently, there will be a limited on the uses of materials derived from petroleum resources such as carbon black. In addition, as for tire performance, it is necessary that rolling resistance is lowered in order to improve fuel efficiency to lower the cost on the environment, and that durability (rubber strength) is improved to run for the long period of time.

As a means for lowering rolling resistance, it is known to use silica which is a raw material derived from resources other than petroleum resources instead of carbon black. When silica is compounded instead of carbon black, not only is rolling resistance reduced, but also the ratio of the raw material derived from petroleum resources can be decreased, the effect on the environment can be taken into consideration, and a decrease in the use of the petroleum supply in the future can be achieved there is a problem in that Mooney viscosity is increased, and processability is deteriorated.

In addition, as another means for lowering rolling resistance, it is known to reduce the amount of carbon black that is used. When the amount of carbon black is reduced, not only is rolling resistance lowered, but also the ratio of the raw material derived from petroleum resources can be decreased, the effect on the environment can be taken into consideration, and a decrease in the use of the petroleum supply in the future can be achieved. But there is a problem in that rubber strength is lowered.

JP-A-2003-63206 discloses an ecological tire excellent in rolling resistance property, processability, and ride quality, in which the ratio of specific resources other than petroleum oil in the tire is increased by using carcass ply topping produced using a specific resource other than petroleum oil. However, this ecological tire does not improve both rolling resistance property and processability, and the rubber hardness thereof is not excellent as compared with a tire constituted of raw materials derived from petroleum resources as a main component. Thus, the necessity of improvement in properties still remains.

SUMMARY OF THE INVENTION

An object of the present invention is to provide a rubber composition for coating a textile cord in which rolling resistance is lowered and processability and rubber strength are excellent, as compared with a rubber composition for coating a textile cord comprising raw materials derived from petroleum resources as a main component, while taking into consideration the effect on the environment and providing for a future decrease in the use of the petroleum resources supply, and to provide a tire using the rubber composition.

The present invention relates to a rubber composition for coating a textile cord, comprising silica in an amount of 25 to 80 parts by mass and a silane coupling agent in an amount of 1 to 15 parts by mass on the basis of 100 parts by mass of a diene rubber, wherein a nitrogen adsorbing-specific surface area of the silica is 70 to 150 $m^2/g$.

It is preferable that the silane coupling agent is represented by the following general formula:

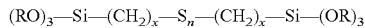

$$(RO)_3-Si-(CH_2)_x-S_n-(CH_2)_x-Si-(OR)_3$$

wherein R is a linear or branched chain alkyl group, the number of carbon atoms of R is an integer of 1 to 8, x is an integer of 1 to 8, n represents the number of sulfur atoms in a polysulfide part, and an average value of n is 2 to 3, and an amount of the silane coupling agent having two sulfur atoms in the polysulfide part is not less than 60% by mass in the whole silane coupling agent.

The present invention further relates to a tire, which comprises a carcass obtained by coating a textile cord with the rubber composition for coating a textile cord.

DETAILED DESCRIPTION

The rubber composition for coating a textile cord of the present invention comprises a rubber component, silica, and a silane coupling agent.

The rubber component contains a diene rubber.

The diene rubber is not particularly limited, and examples of the diene rubber are a natural rubber (NR), an epoxidized natural rubber (ENR), a butadiene rubber (BR), a styrene-butadiene rubber (SBR), an isoprene rubber (IR), a butyl rubber (IIR), an acrylonitrile-butadiene rubber (NBR), an ethylene-propylene-diene rubber (EPDM) and a halogenated butyl rubber (X-IIR), and these rubber components may be used alone or at least 2 kinds thereof may be used in combination. Among these, NR and/or ENR is preferable, and NR is more preferable from the viewpoints that an effect on environments can be taken into consideration, provision for the future decrease of petroleum supply can be satisfied, and further, rolling resistance can be lowered.

As for NR, NR in a grade such as RSS#3 and TSR20 which are conventionally used in rubber industries can be used.

An amount of NR in the rubber component is preferably not less than 85% by mass, and more preferably not less than 95% by mass. When the amount of NR is less than 85% by mass, a ratio of raw materials derived from resources other than petroleum resources cannot be increased, an effect on environments cannot be taken into consideration, provision for the future decrease of petroleum supply cannot be satisfied, and in addition, rolling resistance tends to be increased. An amount of NR is most preferably 100% by mass, in particular.

As silica, there is no particular limitation, and silica prepared by a wet method or a dry method can be used.

A nitrogen adsorbing-specific surface area of silica ($N_2SA$) is not less than 70 $m^2/g$, preferably not less than 80 $m^2/g$, and more preferably not less than 90 $m^2/g$. When $N_2SA$ of silica is less than 70 $m^2/g$, reinforcing effects of the rubber composition due to compounding silica cannot be sufficiently obtained. Further, $N_2SA$ of silica is not more than 150 $m^2/g$, and preferably not more than 130 m²/g. When N₂SA of silica is more than 150 m²/g, a Mooney viscosity is excessively increased, and processability during coating a textile cord tends to be lowered. Further, N₂SA of silica can be measured according to ASTM-D-4820-93.

An amount of silica is not less than 25 parts by mass on the basis of 100 parts by mass of the rubber component, preferably not less than 30 parts by mass, and more preferably not less than 40 parts by mass. When the amount of silica is less than 25 parts by mass, a ratio of a raw material derived from resources other than petroleum resources cannot be increased, an effect on environments cannot be taken into consideration, provision for the future decrease in petroleum supply cannot be satisfied, and reinforcing property is also significantly deteriorated. Further, the amount of silica is not more than 80 parts by mass, and preferably not more than 75 parts by mass. When the amount of silica is more than 80 parts by mass, rolling resistance is increased, and further, a Mooney viscosity is excessively increased, which causes lowering of processability.

In the present invention, it is preferable for the rubber composition to comprise a silane coupling agent represented by the following formula:

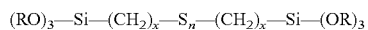

wherein R is a linear or branched chain alkyl group, the number of carbon atoms of R is an integer of 1 to 8, x is an integer of 1 to 8, n represents the number of sulfur atoms in a polysulfide part, and an average value of n is 2 to 3.

In the formula, R is preferably a linear or branched chain alkyl group, and more preferably a linear alkyl group.

The number of carbon atoms in R is preferably 1 to 8, and more preferably 2 to 7. When the number of carbon atoms in R is 0, an alkoxy group does not exist, bonding property between the silica and the silane coupling agent tends to be impaired, and when it is more than 8, affinity between the silica and the silane coupling agent tends to be impaired.

x is preferably 1 to 8, and more preferably 2 to 7. When x is 0, a rubber composition is chemically unstable, and decomposition and deterioration of the silane coupling agent in the rubber composition tends to be promoted. When x is more than 8, an amount of the silane coupling agent necessary to obtain sufficient reinforcing property tends to excessively increase.

n represents the number of sulfur atoms in the polysulfide part. Herein, an average value of n is preferably 2 to 3. When the average value of n is less than 2, a decomposing temperature of the silane coupling agent is high, thus, it becomes possible to knead at a higher temperature, however, a vulcanization speed tends to be fast. When the average value of n is more than 3, a decomposing temperature of the silane coupling agent is lowered, thus, decomposition easily occurs during kneading and sulfur atoms are released, consequently a problem of generating rubber scorch during kneading tends to be easily caused.

Examples of such silane coupling agent are bis(3-triethoxysilylpropyl)polysulfide, bis(2-triethoxysilylethyl)polysulfide, bis(3-trimethoxysilylpropyl)polysulfide, bis(2-trimethoxysilylethyl)polysulfide, bis(4-triethoxysilylbutyl)polysulfide, bis(4-trimethoxysilylbutyl)polysulfide, and bis(triethoxysilylpropyl)polysulfide, and these silane coupling agents can be used alone, or at least 2 kinds thereof may be used in combination.

Among the silane coupling agents contained in the rubber composition for coating a textile cord of the present invention, an amount of the silane coupling agent having two sulfur atoms in the polysulfide part (a silane coupling agent of n=2) is preferably not less than 60% by mass, and more preferably not less than 65% by mass. When the amount of the silane coupling agent of n=2 is less than 60% by mass, a decomposing temperature of the silane coupling agent is relatively low and a decomposition easily occurs during kneading, thus, processability tends to be lowered. Particularly, the amount of the silane coupling agent of n=2 is most preferably 100% by mass.

An amount of the silane coupling agent is not less than 1 part by mass on the basis of 100 parts by mass of the rubber component, and preferably not less than 2 parts by mass. When the amount of the silane coupling agent is less than 1 part by mass, reinforcing effects of a rubber composition due to compounding the silane coupling agent cannot be sufficiently obtained. Further, the amount of the silane coupling agent is not more than 15 parts by mass, and preferably not more than 12 parts by mass. When the amount of the silane coupling agent is more than 15 parts by mass, a Mooney viscosity is excessively increased, and processability is lowered.

In the present invention, by compounding specified amounts of the rubber component containing a diene rubber, a specific silica and specific silane coupling agents, it is possible to provide the rubber composition for coating a textile cord, in which rolling resistance is lowered, and processability and rubber strength are improved, as compared with a rubber composition for coating a textile cord comprising petroleum resources as a main component, while considering an effect on environments and preparing for the future decrease in the petroleum supply, and further there is obtained an effect that an ecological economical tire can be provided, while considering an effect on environments and preparing for the future decrease in the petroleum supply.

An object of the rubber composition for coating a textile cord of the present invention is to consider environments and provide for the future decrease in the petroleum supply by using raw materials derived from resources other than petroleum resources as the main component, and it is preferable that carbon black and petroleum resin are not used.

Besides the above-described rubber component, silica and silane coupling agents, compounding agents conventionally used in the rubber industry such as a softening agent, various antioxidants, stearic acid, zinc oxide, a vulcanizing agent such as sulfur, and various vulcanization accelerators can be suitably compounded in the rubber composition for coating a textile cord of the present invention, according to the necessity.

The rubber composition for coating a textile cord of the present invention is prepared by general processes. Namely, after the above compounding agents are kneaded with a banbury mixer, a kneader, or an open roll, the mixture is vulcanized, thereby, the rubber composition for coating a textile cord of the present invention can be prepared.

It is preferable that the rubber composition for coating a textile cord of the present invention is used by coating a textile cord, not by coating a steel cord, for the reason that rolling resistance is deteriorated if the rubber composition is used by coating a steel cord since organic cobalt compounded in order to increase adhesivity with a steel cord is not compounded.

Herein, the textile cord refers to a cord obtained by twisting a plurality of filaments comprising organic fiber materials, and examples thereof are nylon 6, nylon 66, polyethylene terephthalate (PET), polyethylene-2,6-naphthalate (PEN), polyparaphenylene terephthalamide (PPTA) and a polyvinyl alcohol (PVA). These can be used alone or a plurality of these are selected to be used as an organic fiber material. Particularly, PET is preferable for the reasons that modulus is relatively high, and steering stability is favorable.

In addition, it is preferable that the rubber composition for coating a textile cord of the present invention is used as a carcass for the reason that since organic cobalt compounded in order to increase adhesion with a steel cord is not contained, a rubber composition in an unvulcanized state has high storage stability and is excellent in rubber strength, and further the rubber composition costs low.

The tire of the present invention can be prepared by general processes, using the rubber composition for coating a textile cord of the preset invention. Namely, the rubber composition for coating a textile cord of the present invention compounded with the above-described compounding agents according to the necessity is formed into an unvulcanized rubber sheet in a state of a film having a thickness of not more than 1 mm in the unvulcanized state by using a calender roll with suitably adjusting a line speed in order that the rubber composition does not excessively generate heat, an unvulcanized carcass is prepared by coating a textile cord, and then by molding the unvulcanized carcass cord with other tire parts on a tire molding machine in a general process, an unvulcanized tire is molded. The tire of the present invention is obtained by heating and pressuring this unvulcanized tire in a vulcanizer.

As described above, by using the rubber composition for coating a textile cord of the present invention, the tire of the present invention can be provided as an ecological tire while considering environments and providing for the future decrease in the petroleum supply.

EXAMPLES

The present invention is specifically explained based on Examples, but the present invention is not limited only thereto.

Various chemicals used in Examples and Comparative Examples are collectively explained in the following.
Natural rubber (NR): TSR20
Carbon black: DIABLACK H ($N_2SA$: 79 $m^2/g$) available from Mitsubishi Chemical Corporation
Silica 1: Z115GR ($N_2SA$: 112 $m^2/g$) available from Rhodia Ltd.
Silica 2: Ultrasil VN3 ($N_2SA$: 175 $m^2/g$) available from Degussa Co.
Silane coupling agent: Si75 (bis(triethoxysilylpropyl)disulfide) available from Degussa Co.
Process oil: DIANAPROCESS PS32 available from Idemitsu Kosan Co., Ltd.
Antioxidant: NOCRAC 6C (N-(1,3-dimethylbutyl)-N-phenyl-p-phenylenediamine) available from Ouchi Shinko Chemical Industrial CO., LTD.
Stearic acid: Stearic acid "Kiri" available from NOF Corporation
Zinc oxide: Zinc oxide No. 1 (average particle diameter: 290 nm) available from Mitsui Mining & Smelting Co., Ltd.
Sulfur: CRYSTEX HSOT20 available from Flexsys Co.
Vulcanization accelerator: NOCCELER NS (N-tert-butyl-2-benzothiazolylsulfeneamide) available from Ouchi Shinko Chemical Industrial CO., LTD.

Example 1 and Comparative Examples 1 to 3

According to compounding prescriptions shown in Table 1, by using a 1.7 L banbury mixer manufactured by Kobe Steel., Ltd., chemicals other than sulfur and a vulcanization accelerator were filled to have a filling rate of 58% and kneaded for 3 minutes at 90 rpm until a temperature reached 150° C. to obtain a kneaded product. Then, the sulfur and vulcanization accelerator were added to the obtained kneaded product, and the mixture was kneaded using a calender roll for 3 minutes under conditions of a line speed of 20 rpm and a temperature of 90° C. to obtain an unvulcanized rubber sheet in a state of a thin film having a thickness of 0.7 mm. Further, vulcanized rubber sheets of Example 1 and Comparative Examples 1 to 3 were prepared by vulcanizing the obtained unvulcanized rubber sheet for 10 minutes under a temperature of 175° C.

(Processability)

A test piece having a specified size was prepared from the above-described unvulcanized rubber sheet, and according to JIS K 6300 "Rubber, unvulcanized—Physical properties—Part 1: Determination of Mooney viscosity and pre-vulcanization characteristics with Mooney viscometer", a Mooney viscosity ($ML_{1+4}$/130° C.) of the unvulcanized rubber sheet at the time of taking 4 minutes after rotating a small rotor under a temperature of 130° C. heated by preheating for 1 minute was measured, using a Mooney viscosity tester. Further, a Mooney viscosity of each composition was expressed as an index by the following calculation formula, assuming the Mooney viscosity index of Comparative Example 1 as 100. The larger the Mooney viscosity index is, the smaller the Mooney viscosity is, which indicates processability is excellent.

(Mooney viscosity index)=(Mooney viscosity of Comparative Example 1)÷(Mooney viscosity of each composition)×100

(Rubber Strength)

A vulcanized rubber test piece was prepared from the above-described vulcanized rubber sheet by using a No. 3 dumbbell, and according to JIS K 6251 "Rubber, vulcanized or thermoplastic—Determination of tensile stress-strain properties", the tensile test was carried out to measure strength at break (TB) and elongation at break (EB), and the product thereof (TB×EB) was calculated. It indicates that the larger TB×EB is, the more excellent the rubber strength is.

(Rolling Resistance)

An unvulcanized carcass was prepared by coating a textile cord with the above-described unvulcanized rubber sheet, and a tire for testing (tire size: 195/65R15) was prepared by laminating the unvulcanized carcass with other tire parts and vulcanizing for 10 minutes under a temperature of 175° C. Further, in Example 1 and Comparative Examples 1 and 2, polyethylene terephthalate (PET) was used as a cord, and in Comparative Example 3, a steel cord was used.

Rolling resistance was measured at running the test tire under the conditions of a rim of 6JJ×15, an inner pressure of 230 kPa, a lord of 49N, and a speed at 80 km/h by using a rolling resistance tester manufactured by STL Ltd., and rolling resistance of each composition was expressed as an index, assuming the rolling resistance index of Comparative Example 1 as 100. The larger the rolling resistance is, the more the rolling resistance is lowered, which indicates excellent.

(Rolling resistance index)=(Rolling resistance of Comparative Examples 1)÷(Rolling resistance of each composition)×100

Evaluation results of the above-described tests are shown in Table 1.

TABLE 1

|  | Ex. | Com. Ex. | | |
|---|---|---|---|---|
|  | 1 | 1 | 2 | 3 |
| Amounts (part by mass) | | | | |
| NR | 100 | 100 | 100 | 100 |
| Carbon black | — | 50 | — | — |
| Silica 1 | 50 | — | — | 50 |
| Silica 2 | — | — | 50 | — |
| Silane coupling agent | 4 | — | 4 | 4 |
| Process oil | 7 | 7 | 7 | 7 |
| Antioxidant | 2 | 2 | 2 | 2 |
| Stearic acid | 2 | 2 | 2 | 2 |
| Zinc oxide | 5 | 5 | 5 | 5 |
| Sulfur | 3 | 3 | 3 | 3 |
| Vulcanization accelerator | 1 | 1 | 1 | 1 |
| Kind of cord | PET | PET | PET | Steel |
| Evaluation results | | | | |
| Rolling resistance index | 105 | 100 | 102.5 | 90 |
| Mooney viscosity index | 113 | 100 | 75 | 113 |
| TB × EB | 7050 | 6500 | 6450 | 7050 |

Comparative Example 1 is a rubber composition for coating a textile cord comprising a large amount of conventional raw materials derived from petroleum oil containing carbon black.

In Example 1 wherein NR, specific silica and silane coupling agent were compounded in specified amounts, since the rubber composition comprises raw materials derived from resources other than petroleum resources as the main component, an effect on environments can be taken into consideration, and provision for the future decrease in the petroleum supply can be satisfied, and further, a rolling resistance can be decreased and the rubber strength and processability can be improved, as compared with Comparative Example 1 containing a large amount of raw materials derived from petroleum resources.

In Comparative Example 2 wherein silica having $N_2SA$ which is not within the specified range is compounded, the rubber composition comprises resources other than petroleum oil as the main component, an effect on environments can be taken into consideration, and provision for the future decrease in the petroleum supply can be satisfied, and further, as compared with Comparative Example 1 containing a large amount of raw materials derived from petroleum resources, rubber strength can be maintained and rolling resistance can be lowered, but processability is significantly deteriorated.

According to the present invention, by compounding specified amounts of a specific rubber component, a specific silica and a specific silane coupling agent, it is possible to provide a rubber composition for coating a textile cord, and a tire using the rubber composition, wherein rolling resistance is lowered, and processability and rubber strength are excellent, as compared with a rubber composition for coating a textile cord comprising raw materials derived from petroleum resources as a main component, and to provide a tire using the rubber composition, while considering environments and providing for the future decrease in petroleum resources supply.

What is claimed is:

1. A tire having a carcass, wherein said carcass comprises textile cord coated with a rubber composition, said rubber composition for coating a textile cord comprising:
   25 to 80 parts by mass of silica; and 1 to 15 parts by mass of a silane coupling agent on the basis of 100 parts by mass of a diene rubber which contains a natural rubber in amount not less than 85% by mass and an epoxidized natural rubber,
   wherein the nitrogen adsorbing-specific surface area of said silica is 70 to 150 $m^2/g$, wherein carbon black is not contained in said rubber composition for coating a textile cord,
   wherein said silane coupling agent is represented by the following general formula:

$(RO)_3\text{—Si—}(CH_2)_x\text{—}S_n\text{—}(CH_2)_x\text{—Si—}(OR)_3$ wherein R is a linear or branched chain alkyl group, the number of carbon atoms of R is an integer of 1 to 8, x is an integer of 1 to 8, n represents the number of sulfur atoms in a polysulfide part, and an average value of n is 2 to 3, and
   wherein the silane coupling agent having two sulfur atoms in the polysulfide part is present in an amount of not less than 60% by mass in the whole silane coupling agent, and
   wherein the textile cord is obtained by twisting a plurality of organic fiber material filaments, wherein the organic fiber material is polyethylene terephthalate.

2. The tire of claim 1, wherein the natural rubber is present in an amount of not less than 95% by mass.

3. The tire of claim 1, wherein the silica is present in an amount of 40 to 75 parts by mass.

* * * * *